US011221399B2

(12) United States Patent
Kunz et al.

(10) Patent No.: US 11,221,399 B2
(45) Date of Patent: Jan. 11, 2022

(54) DETECTING SPURIOUS OBJECTS FOR AUTONOMOUS VEHICLES

(71) Applicant: Waymo LLC, Mountain View, CA (US)

(72) Inventors: Clayton Kunz, Mill Valley, CA (US); Christian Lauterbach, Campbell, CA (US); Roshni Cooper, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 189 days.

(21) Appl. No.: 16/217,899

(22) Filed: Dec. 12, 2018

(65) Prior Publication Data

US 2020/0191914 A1    Jun. 18, 2020

(51) Int. Cl.
*G01S 7/48* (2006.01)
*G05D 1/00* (2006.01)
*G05D 1/02* (2020.01)
*G01S 7/487* (2006.01)

(52) U.S. Cl.
CPC .......... *G01S 7/4802* (2013.01); *G01S 7/4808* (2013.01); *G01S 7/4876* (2013.01); *G05D 1/0088* (2013.01); *G05D 1/0231* (2013.01); *G05D 1/0257* (2013.01); *G05D 2201/0213* (2013.01)

(58) Field of Classification Search
None
See application file for complete search history.

(56) References Cited

U.S. PATENT DOCUMENTS

| 7,142,150 | B2 | 11/2006 | Thackray |
| 8,126,642 | B2* | 2/2012 | Trepagnier ............. G01S 17/86 |
| | | | 701/423 |
| 8,170,787 | B2* | 5/2012 | Coats .................... G08G 1/166 |
| | | | 701/301 |
| 8,577,538 | B2 | 11/2013 | Lenser et al. |
| 8,818,609 | B1 | 8/2014 | Boyko et al. |
| 8,983,705 | B2 | 3/2015 | Zhu et al. |
| 9,234,618 | B1* | 1/2016 | Zhu ........................ G01S 7/497 |
| 9,753,126 | B2 | 9/2017 | Smits |
| 9,958,379 | B1* | 5/2018 | Zhu ....................... G01S 7/4808 |

(Continued)

OTHER PUBLICATIONS

International Search Report and Written Opinion for Application No. PCT/US2019/062163 dated Mar. 18, 2020.

*Primary Examiner* — Nicholas K Wiltey
(74) *Attorney, Agent, or Firm* — Botos Churchill IP Law

(57) ABSTRACT

Aspects of the disclosure relate to detecting spurious objects. For instance, a model may be trained using raining data including a plurality of LIDAR data points generated by a LIDAR sensor of a vehicle. Each given LIDAR data point includes location information and intensity information, and is associated with waveform data for that given LIDAR data point. At least one of the plurality of LIDAR data points is further associated with a label identifying spurious objects through which the vehicle is able to drive. The model and/or a plurality of heuristics may then be provided to a vehicle in order to allow the vehicle to determine LIDAR data points that correspond to spurious objects. These LIDAR data points may then be filtered from sensor data, and the filtered sensor data may be used to control the vehicle in an autonomous driving mode.

22 Claims, 12 Drawing Sheets

(56) References Cited

U.S. PATENT DOCUMENTS

| | | | |
|---|---|---|---|
| 2007/0219720 A1* | 9/2007 | Trepagnier | G05D 1/0278 |
| | | | 701/300 |
| 2011/0144962 A1* | 6/2011 | Blask | G06T 17/05 |
| | | | 703/6 |
| 2014/0336935 A1* | 11/2014 | Zhu | G01S 17/86 |
| | | | 702/3 |
| 2017/0123421 A1* | 5/2017 | Kentley | B60W 30/00 |
| 2017/0124781 A1 | 5/2017 | Douillard et al. | |
| 2017/0300059 A1 | 10/2017 | Rust | |
| 2018/0060725 A1 | 3/2018 | Groh et al. | |
| 2018/0307925 A1* | 10/2018 | Wisniowski | G06K 9/6271 |
| 2019/0056504 A1* | 2/2019 | Hartman | G01S 17/42 |
| 2019/0170867 A1* | 6/2019 | Wang | G01S 13/878 |
| 2019/0219697 A1* | 7/2019 | Castorena Martinez | |
| | | | G01S 17/931 |
| 2019/0227553 A1* | 7/2019 | Kentley-Klay | G05D 1/0088 |

* cited by examiner

DETECTING SPURIOUS OBJECTS FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, etc. This information is critical to allowing the vehicle's computing systems to make appropriate driving decisions for the vehicle. However, it can be difficult for a vehicle's computing devices to distinguish between actual objects that the vehicle must respond to and spurious objects which can be ignored.

BRIEF SUMMARY

Aspects of the disclosure provide a method of training a model. The method includes receiving, by one or more computing devices, training data including a plurality of LIDAR data points generated by a LIDAR sensor of a vehicle, each given LIDAR data point (1) including location information and intensity information and (2) being associated with waveform data other than the intensity information for that given LIDAR data point, and wherein at least one of the plurality of LIDAR data points is further associated with a label identifying a spurious object, the spurious object being distinguishable from a solid object by the waveform data associated with the last least one of the plurality of LIDAR data points and through which the vehicle is able to drive; and using, by the one or more computing devices, the training data to train the model in order to increase accuracy of the model, and wherein the model is configured to, for a given input LIDAR data point and corresponding waveform data, providing output indicating whether the given input LIDAR data point is a spurious object.

In one example, wherein spurious objects include objects corresponding to at least one of vehicle exhaust, dust, rain, snow, or fog. In another example, the output provides a likelihood of the given input LIDAR data point corresponding to a spurious object. In another example, the training data further includes, for a particular LIDAR data point of the plurality of LIDAR data points, a peak elongation. In another example, the training data further includes, for a particular LIDAR data point of the plurality of LIDAR data points, a number of peaks in the waveform data associated with the particular LIDAR data point. In another example, the training data further includes, for a particular LIDAR data point of the plurality of LIDAR data points, a peak width for the waveform data associated with the particular LIDAR data point. In another example, the waveform data for a particular LIDAR data point of the plurality of LIDAR data points includes a plurality of samples of light received at the LIDAR sensor for the particular LIDAR data point. In another example, the label further identifies a type of spurious object, such that the output further includes a type of spurious object for the given input LIDAR data point. In another example, the plurality of LIDAR data points corresponds to a single frame captured by the LIDAR sensor. In another example, the frame corresponds to one 360 degree rotation of the LIDAR sensor. In another example, the spurious object is precipitation. In another example, the spurious object is dust. In another example, the spurious object is fog.

Another aspect of the disclosure provides a method of controlling a vehicle. The method includes receiving, by one or more computing devices, a plurality of LIDAR data points generated by a LIDAR sensor of the vehicle, each given LIDAR data point of the plurality of LIDAR data points (1) including location information and intensity information and (2) being associated with waveform data other than the intensity information of the given LIDAR data point; determining, by the one or more computing devices, that one or more LIDAR data point of the plurality of LIDAR data points correspond to a spurious object using the waveform data associated with the plurality of LIDAR data points, the spurious object being distinguishable from a solid object by the waveform data associated with the last least one of the plurality of LIDAR data points and through which the vehicle is able to drive; filtering, by the one or more computing devices, the plurality of LIDAR data points based on the determination; and using, by the one or more computing devices, the filtered plurality of LIDAR data points to control the vehicle in an autonomous driving mode.

In one example, spurious objects include objects corresponding to at least one of vehicle exhaust, dust, rain, snow, or fog. In another example, the determining is further based on one or more heuristics. In this example, the one or more heuristics is based on a peak elongation of waveform data for a particular LIDAR data point. In addition or alternatively, the one or more heuristics is based on a number of peaks in waveform data for a particular LIDAR data point. In addition or alternatively, the one or more heuristics is based on a peak width in waveform data for a particular LIDAR data point. In addition or alternatively, a particular LIDAR data point of the plurality of LIDAR data points is further associated with a peak elongation relative to an expected peak width, and wherein the peak elongation is used to determine whether the LIDAR data point corresponds to a spurious object through which the vehicle is able to drive. In another example, a particular LIDAR data point of the plurality of LIDAR data points is associated with a plurality of peaks in the waveform data of the particular LIDAR data point, and wherein peak width for each of the plurality of peaks is used to determine whether the particular LIDAR data point corresponds to a spurious object through which the vehicle is able to drive. In another example, the waveform data associated with a particular LIDAR data point of the plurality of LIDAR data points includes a plurality of samples of light received at the LIDAR sensor for the particular LIDAR data point. In another example, the method also includes using the waveform data associated with the one or more LIDAR data points to determine a type of the spurious object. In another example, the plurality of LIDAR data points corresponds to a single frame captured by the LIDAR sensor. In this example, the frame corresponds to one 360 degree rotation of the LIDAR sensor. In another example, the method also includes, prior to the filtering, grouping the one or more LIDAR data points determined to correspond to a spurious object such that only grouped LIDAR data points are filtered from the plurality of LIDAR data points. In this example, the grouping is based on a threshold minimum density of points determined to correspond to a spurious object within a given volume of space. In addition, the filtering allows the one or more LIDAR data points to be ignored by one or more systems of the vehicle when controlling the vehicle in the autonomous driving mode. In another example, the method also includes, prior to the filtering, confirming the determination based on whether the locations of the one or more LIDAR data points correspond to a location having a particular signal from a second sensor of the vehicle, and wherein the filtering if further based on the confirmation. In this example, the second sensor is a radar unit. In another example, the method also includes receiving information identifying at least some of the plurality of LIDAR data points correspond to an object being road user of a particular type, and prior to the filtering, confirming the determination based on whether the one or more LIDAR data points correspond to the road user of a particular type based on the received information, and wherein the filtering is further based on the confirmation. In this example, the particular type is one of a pedestrian, a bicyclist, or a vehicle. In addition or alternatively, the information includes a bounding box for the object, and confirming the determination is further based on whether the one or more LIDAR data points are associated with locations within the bounding box. In another example, the spurious object is precipitation. In another example, the spurious object is dust. In another example, the spurious object is fog.

DETAILED DESCRIPTION

Overview

Figure 1:
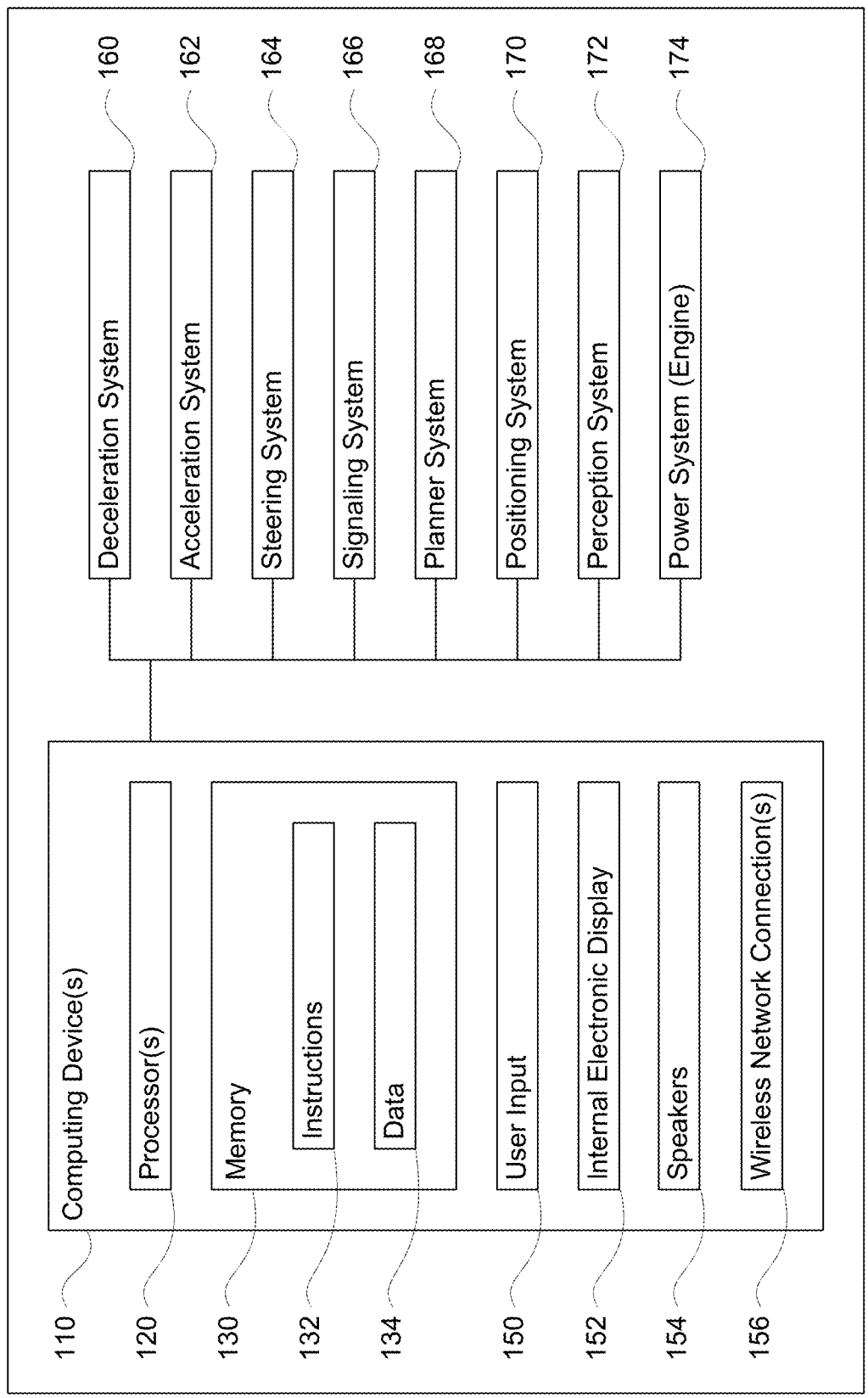
FIG. 1 is a functional diagram of an example vehicle in accordance with an exemplary embodiment.

The technology relates to recognizing the detection of spurious objects or materials such as vehicle exhaust, dust, precipitation, fog, etc., that may be driven through. These spurious objects may appear to be solid objects when observed from LIDAR data, but can be distinguished from solid objects from their waveform data. In order to do so, different approaches may be used. For instance, a heuristic-based approach may be used to determine spurious objects. Alternatively, a model may be trained to determine whether a given LIDAR sensor point is likely to correspond to a spurious object. The model itself may be a machine learning model including a neural network such as deep neural networks, classifiers, decision trees, boosting trees, etc.

In one example, a plurality of heuristics may be used to determine whether LIDAR sensor data corresponds to spurious objects. In other words, a LIDAR sensor may function by shooting a pulse of light which is reflected off of an object and returns back to sensor. The returning light is then sampled as it is received by the sensor to provide the intensity of light at the moment the sample is taken. Together, these samples may be used to determine a waveform for an object for instance, over a period of nanoseconds.

Typically, this waveform is processed to determine the distance that the light traveled as well as the intensity of the returning light. However, the waveform may also be processed to identify waveform data including the peak width, the number of peaks, the shape of the peak(s), and peak elongation. This in turn, may be used to identify spurious objects.

For instance, the waveform from spurious objects may tend to become stretched out as some of the light will reflect back from the spurious object and other of the light may pass beyond the spurious object. How stretched out the waveform is and how many "humps" or peaks may suggest that the light partially passed through a first object (meaning it is likely to be spurious) and was reflected off of one or more other objects beyond that first object. In this regard, the heuristics may define the characteristics of waveforms that can be used to detect or identify spurious objects.

As noted above, as an alternative to the heuristic-based approach, a model may be trained to detect spurious objects. In order to train the model, training data must be generated. For instance, LIDAR data may be analyzed and labeled. These labels may identify spurious LIDAR data points of the LIDAR data. The labels may be initially applied, for instance, by human operators, and in some cases, in part by a vehicle's perception system and/or by applying a machine learned model to the LIDAR data. Although the LIDAR data points of the frames may include only location and intensity information, the training data may also include additional details such as the waveforms for those LIDAR data points. In addition to the waveform itself, other information about the waveform may also be used as training data. The model may then be trained using the training data to identify which LIDAR data points of an input frame correspond to a spurious object. As such, the output of the model applied to LIDAR data may therefore be a list of all LIDAR data points and a corresponding likelihood of being a spurious object or alternatively, a list of only those LIDAR data points having a high enough likelihood to be treated as spurious.

The heuristics and/or the model may then be provided to one or more vehicles in order to allow the computing devices of those vehicles to make better informed driving decisions. For instance, during operation, each frame captured by a LIDAR sensor of the vehicle's perception system may be processed in order to identify which LIDAR data points are likely to correspond to a spurious object. These LIDAR data points identified as spurious objects may then be grouped together. These groups of points and/or bounding boxes may then be filtered from the frame. The resulting filtered frames may then be used to make driving decisions for the vehicle.

The features described herein allow for the generation of a useful and effective model for the detection of spurious objects. While typical approaches may rely on intensity and contextual information, by using the waveform data, the model can be significantly more effective at detecting spurious objects. Moreover, the model can be combined with other information and heuristics to not only detect spurious objects, but also determine which of those spurious objects should and should not be filtered or ignored when deciding how to control the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, and perception system 172 in order to control the movement, speed, etc. of vehicle 100 in accordance with the instructions 132 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planner system 168 may be used by computing device 110 in order to determine and follow a route to a location. In this regard, the planner system 168 and/or data 134 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2:
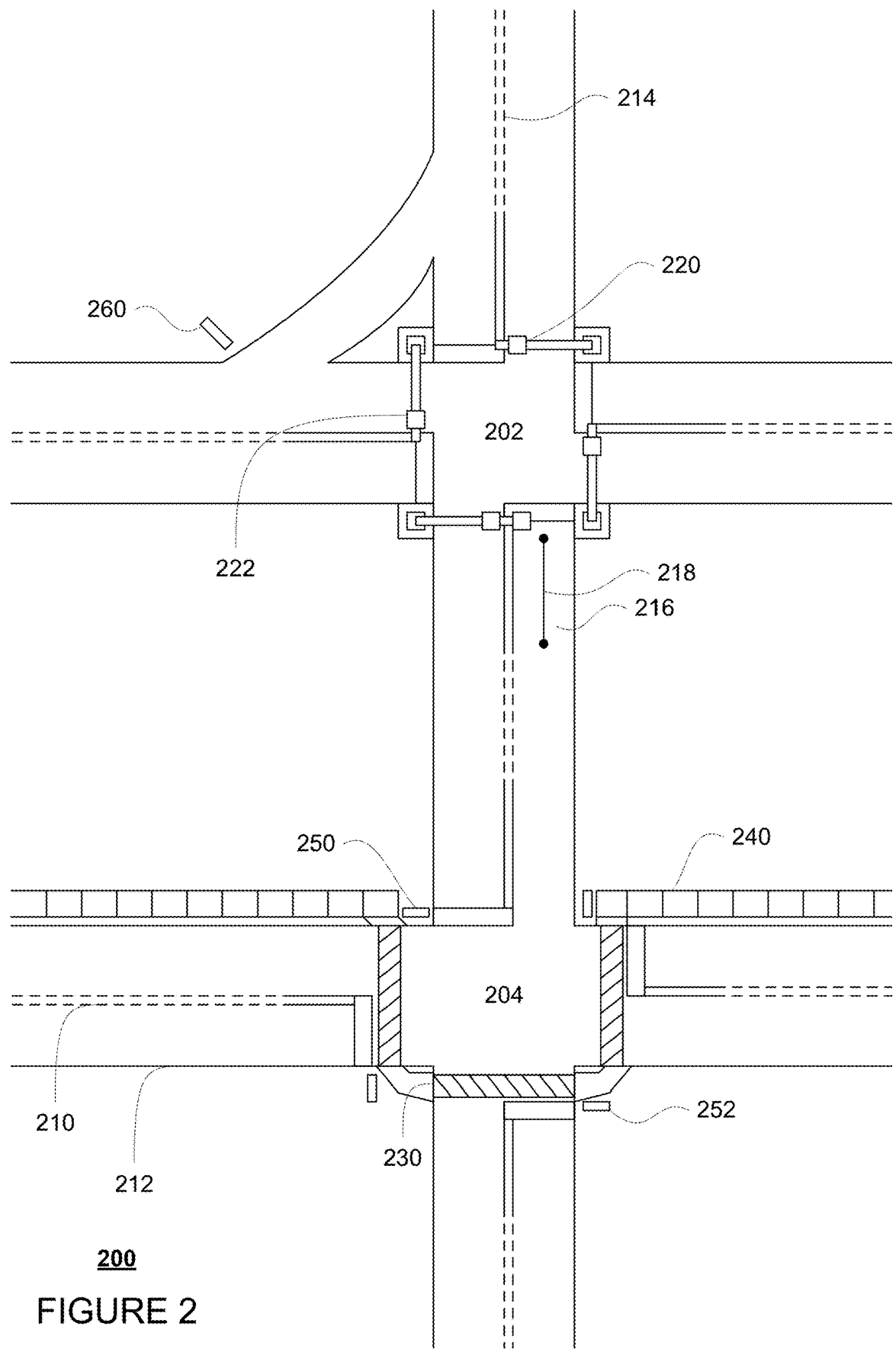
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, stop signs 250, 252, and yield sign 260. In this regard, the map information includes the three-dimensional (3D) locations of traffic lights 220, 222 as well as information identifying the lanes which are controlled by these traffic lights. For instance, traffic light 220 may be controlled by lane 216 corresponding to a road segment 218. For clarity and simplicity, only road segment 218 is depicted. However, map information 200 may include road segments for all of the drivable areas of the map information. In other words, the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
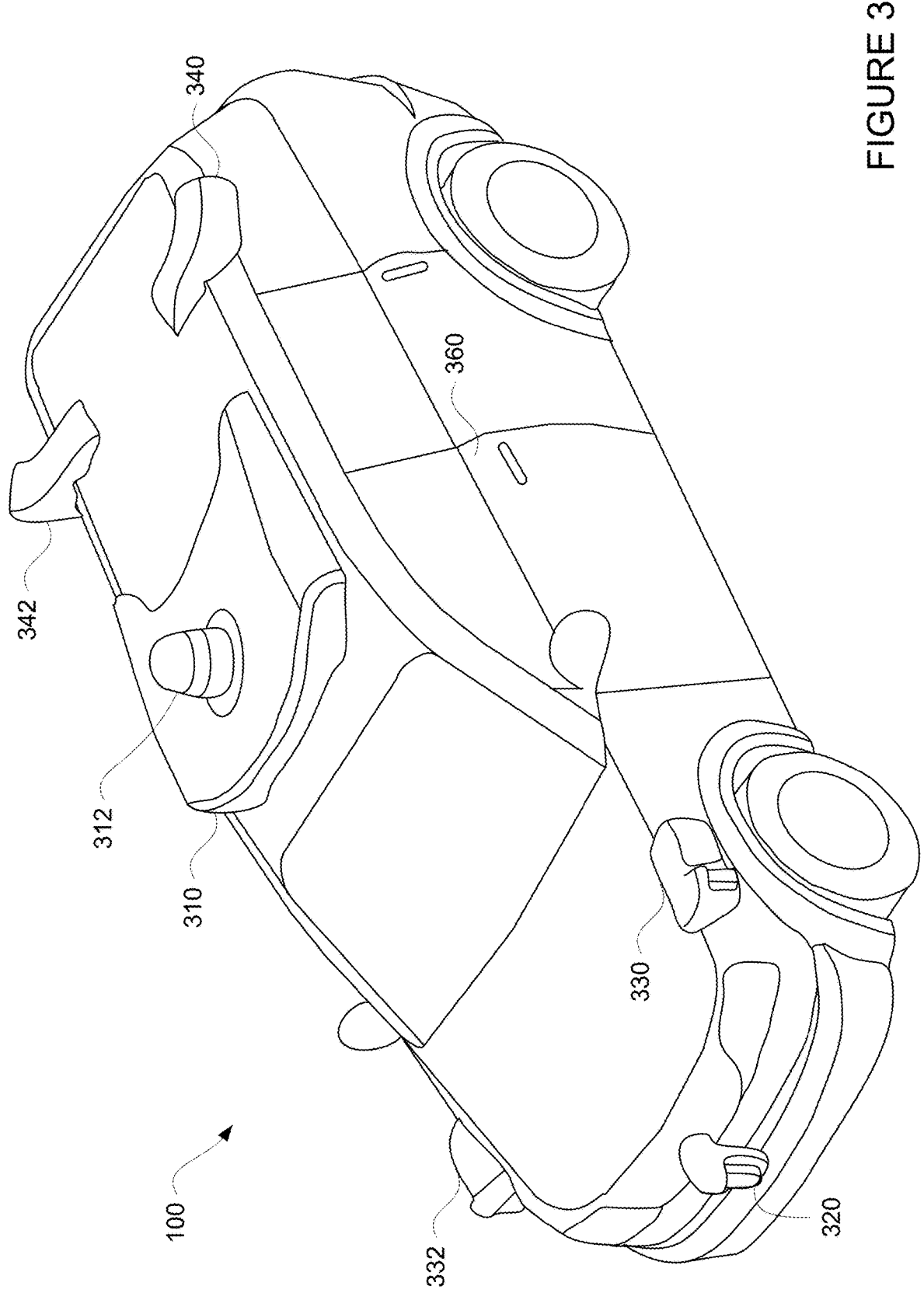
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may control computing devices of an autonomous driving computing system or be incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner system 168, positioning system 170, perception system 172, and power system 174 (i.e., the vehicle's engine or motor) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to control the vehicle. As an example, a perception system software module of the perception system 172 may use sensor data generated by one or more sensors of an autonomous vehicle, such as cameras, LIDAR sensors, radar units, sonar units, microphones, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing device 110 may control the vehicle by controlling various components. For instance, by way of example, computing device 110 may navigate the vehicle to a destination location completely autonomously using data from the detailed map information and planner system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
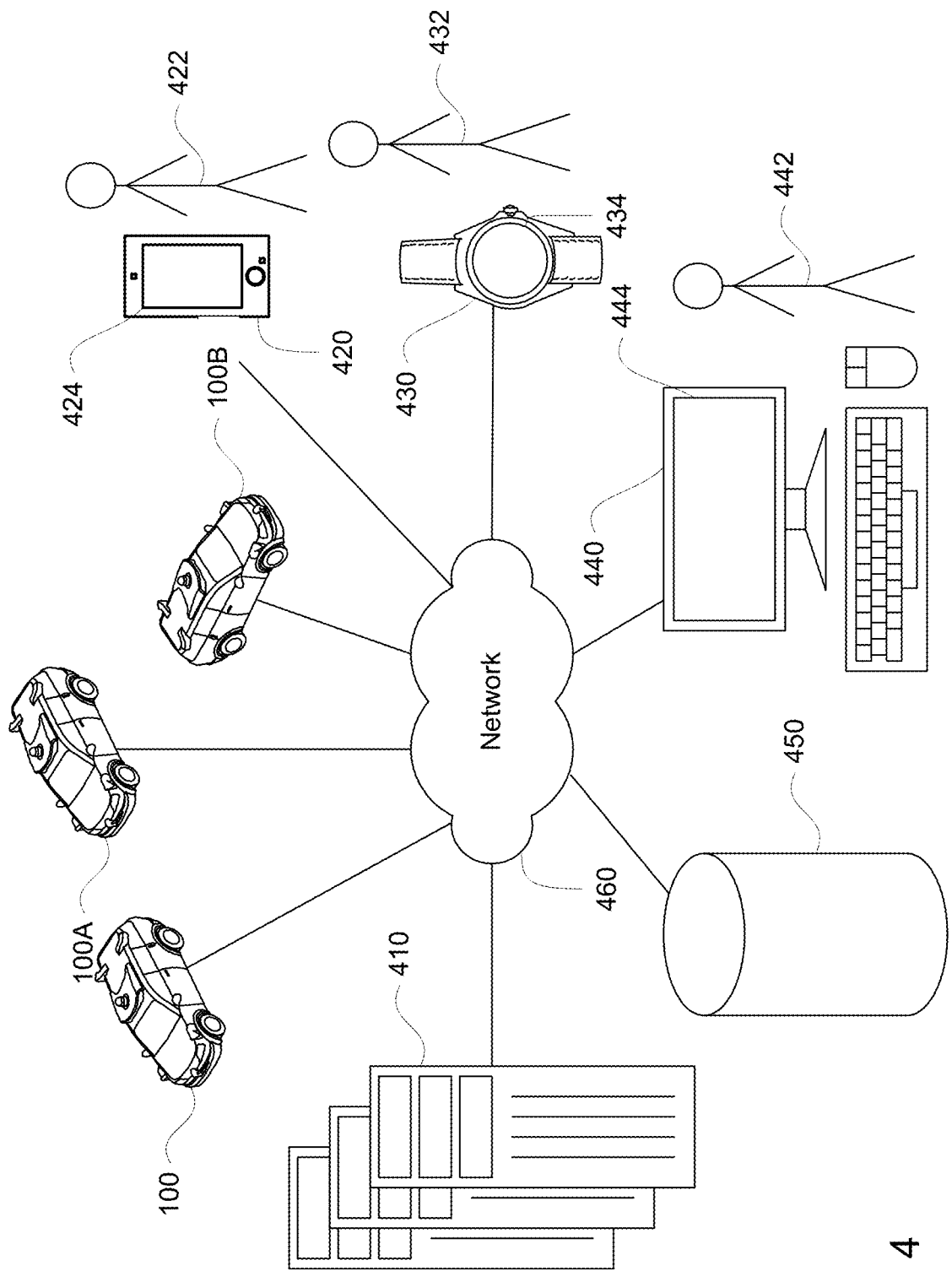
FIG. 4 is a pictorial diagram of an example system in accordance with aspects of the disclosure.
Figure 5:
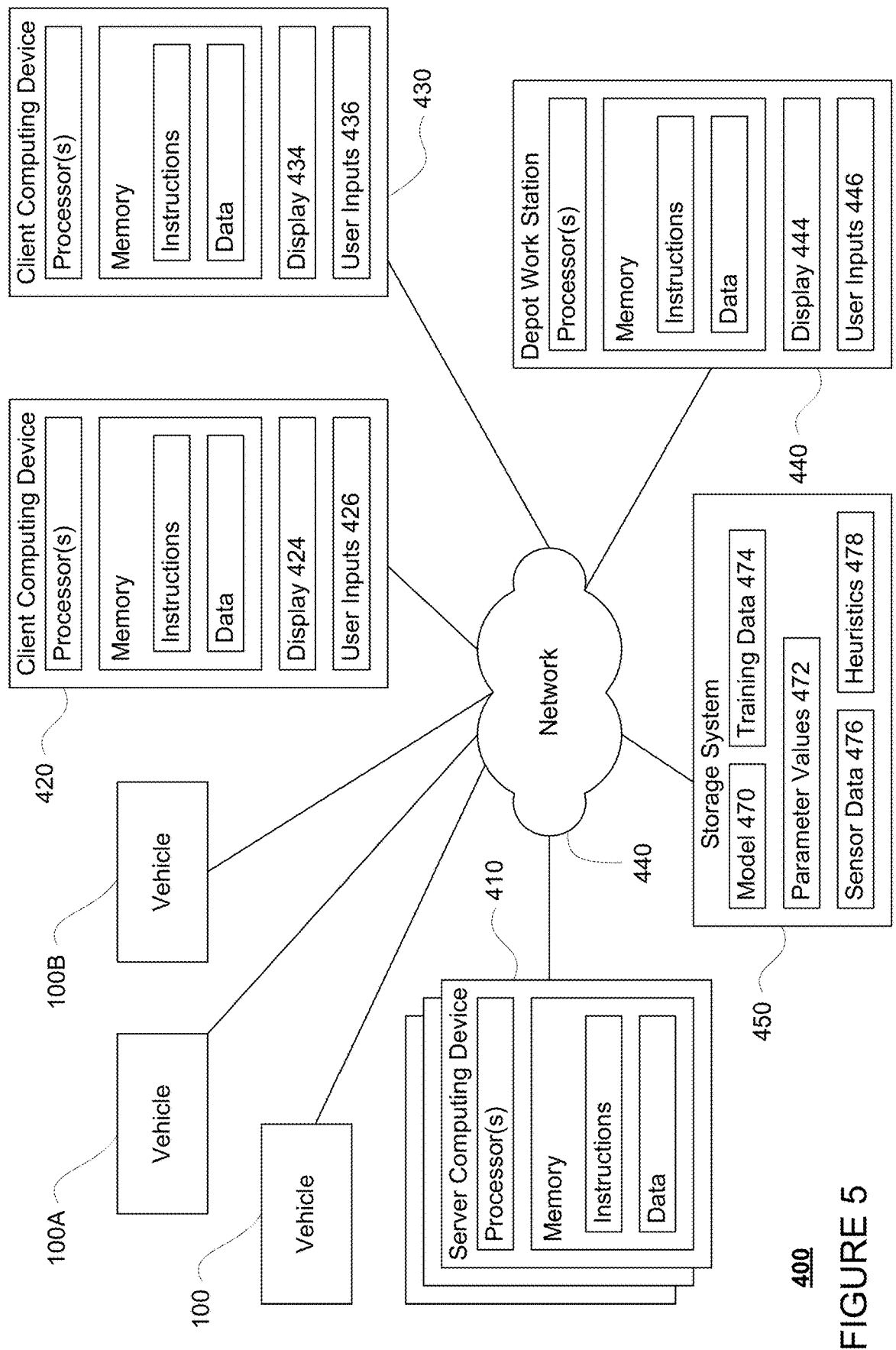
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and receiving data from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information to and from the server computing devices 410. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices, in order to perform some or all of the features described herein. This information may be retrieved or otherwise accessed by a server computing device, such as one or more server computing devices 410, in order to perform some or all of the features described herein.

The storage system 450 may store sensor data captured by a vehicle's perception system, such as perception system 172 of vehicle 100. For instance, the LIDAR sensor data may include data points corresponding to the locations and intensity (or reflectivity) of surfaces off of which light generated by the LIDAR sensor is reflected back to LIDAR sensor. In addition to this information, the storage system may store corresponding waveform data for the LIDAR data. In other words, a LIDAR sensor may function by shooting a pulse or short burst of light which is reflected off of an object and returns back to sensor. The returning light or return is then sampled as it is received by the sensor to provide the intensity of light at the moment the sample is taken. Together, these samples may be used to determine a waveform for a particular return for instance, over a period of nanoseconds. Each return may therefore correspond to light reflected from a surface of an object and may be used to generate a LIDAR data point for that surface based on the time it took for the return to reach the sensor as well as the intensity of the return. In other words, the waveform may be used by computing components of the LIDAR sensor itself in order to determine the distance that the light traveled as well as the intensity of the returning light. This processing may provide the location and intensity (amplitude) for each LIDAR data point. The collection of the LIDAR data points for the pulses and corresponding returns over a period of a single rotation of a LIDAR sensor, for instance a 360 degree rotation, may be referred to as a LIDAR sensor frame.

Figure 6:
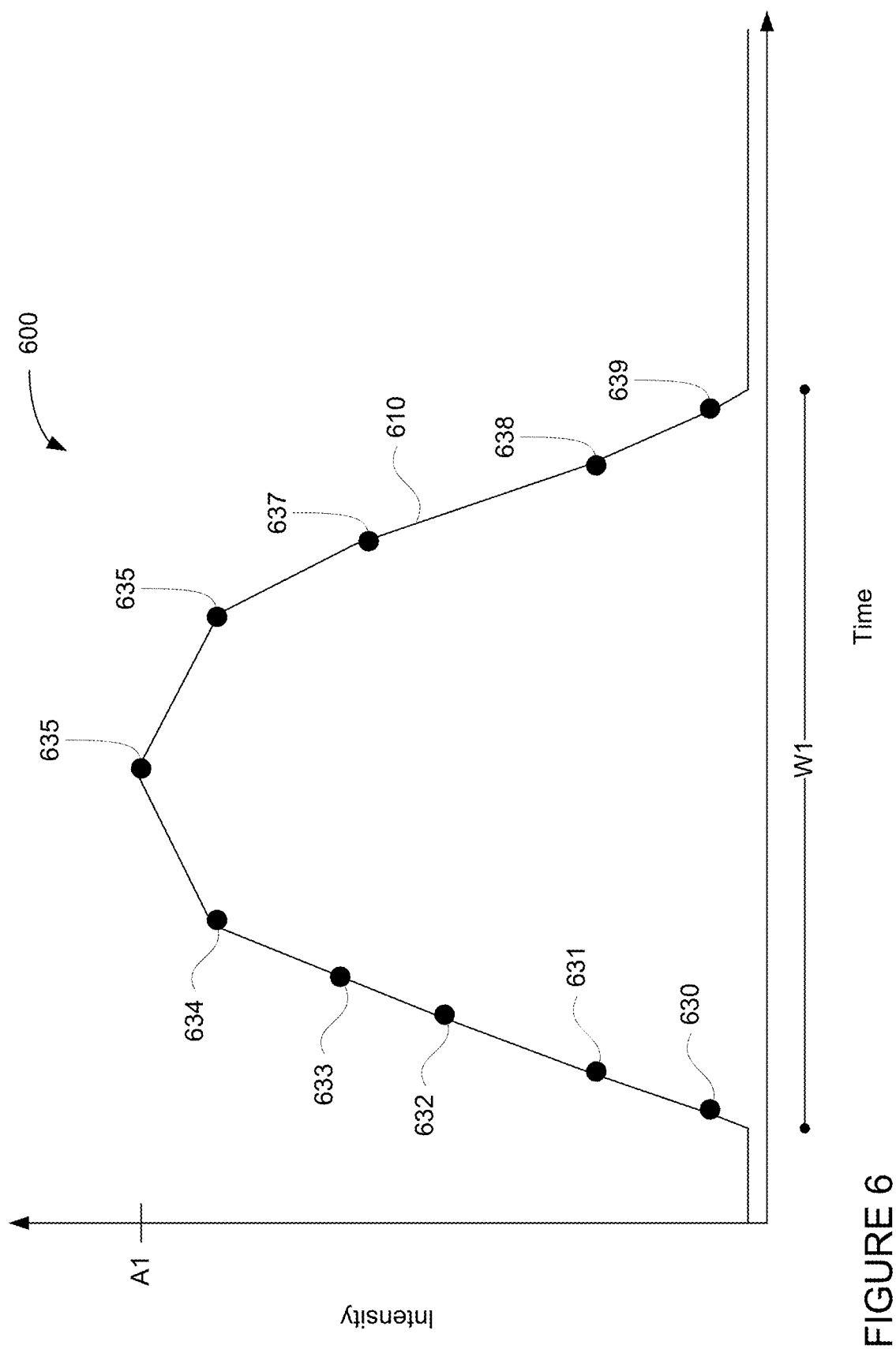
FIG. 6 is an example of a waveform in accordance with aspects of the disclosure.

The waveform may also be analyzed to provide the aforementioned waveform data including the peak width, the number of peaks, the shape of the peak(s), and peak elongation. For instance, turning to FIG. 6, an example waveform 600 for a solid (non-spurious) surface is provided. In this example, there is a single peak 610 corresponding to a curve fit to a plurality of samples 630-639 for a single return from a single pulse. The amplitude of the peak 610 (A1) corresponds to the intensity of the LIDAR data point, and the width W1 of the peak 610 corresponds to the time interval during which the sampled intensities are higher than the background intensity (e.g. noise). The shape of the peak 610 indicates the variation in intensity among samples over the time interval.

Figure 7:
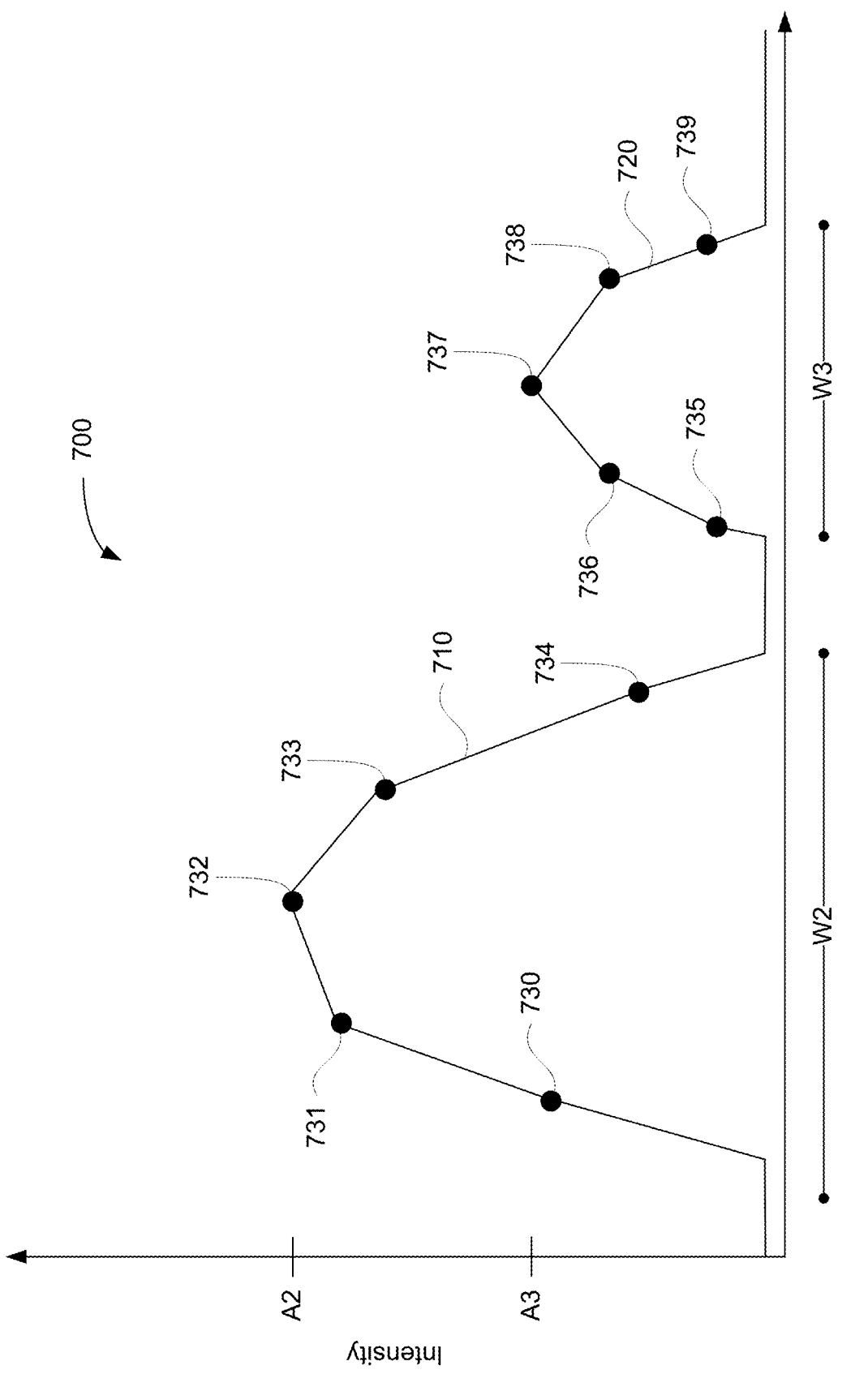
FIG. 7 is an example of a waveform in accordance with aspects of the disclosure.

In FIG. 7, an example waveform 700 for a spurious object is provided. As noted above, the characteristics of the waveform (or waveform data) other than the peak intensity can allow a corresponding LIDAR data point to be distinguished from a solid object. In this example, there are multiple peaks 710, 720 or curves fit to a plurality of samples 730-739. In addition, rather than a single return, a single pulse resulted in multiple, here two, returns. Again, the amplitude of the peak 710 corresponds to the intensity or intensity information for the LIDAR data point for the waveform. In addition, the amplitude A1 or intensity of the peak 710 is greater than the amplitude A3 or intensity of the peak 720. Again, the widths W2, W3 of the peaks 710, 720, correspond to the time interval during which the sampled intensities are higher than the background intensity (e.g. noise). The shapes of the peaks 710, 720 indicates the variation in intensity among samples over the time intervals.

The storage system 450 may store a plurality of heuristics 478. As discussed further below, these heuristics may be used to determine whether LIDAR sensor data corresponds to spurious objects based on the aforementioned waveform data. For instance, as compared to the waveform from a return from a solid object, the waveform from for a spurious object may tend to become stretched out as some of the light will reflect back from the spurious object and other of the light may pass beyond the spurious object. How stretched or elongated a peak is as compared to an expected width of a peak for a solid object may correspond to the amount of magnitude of the peak elongation. For instance, if the expected width is T (for instance, measured in nanoseconds), and the actual width is twice that or 2T, the peak elongation may be 100% and thus, very likely to correspond to a spurious object. As such, this peak elongation as well as the number of peaks for a single return may suggest that the light of the pulse partially passed through a first object (meaning it is likely to be spurious) and was reflected off of one or more other objects beyond that first object.

In this regard, the heuristics may define the characteristics of waveforms for spurious objects. For instance, for a first heuristic, if there is more than one peak in the waveform for a LIDAR data point, this may be used to determine that the waveform data for a return indicates a spurious object. For instance, in the example of FIG. 6, the waveform 600 includes only a single peak which indicates that waveform 600 corresponds to a solid object. At the same time, in the example of FIG. 7, the waveform 700 includes more than one peak which indicates that the waveform 700 corresponds to a spurious object. For another instance, for a second heuristic, the amount of peak elongation, or rather the change in the width of the waveform returned to the LIDAR sensor from the width of the waveform of the light from the beam shot out by the LIDAR sensor, may be used to determine that the waveform corresponds to a spurious object. In other words, the greater the elongation, the greater the likelihood that the waveform data for a return indicates a spurious object. For example, the width of the peak 710 is greater than the width of the peak 610. As such, this may be used to determine that the waveform corresponds to a spurious object. As a second heuristic, the relative intensities of two peaks from the same pulse may also be used. For example, if the first peak is of lower intensity than the second peak for the same pulse (i.e. there are multiple returns) as in the examples of peaks 710 and 720, this may be a strong indicator that the first peak is a spurious point. Especially when the first pulse is also elongated. As a further example, the specific shape of the waveform (e.g. mountain-shaped vs. butte-shaped) may also be used as a heuristic to determine whether a waveform corresponds to a spurious object. Other heuristics that are combinations of point intensity, elevation angle, height above ground, may also be used. For example, a low intensity LIDAR data point a meter off the ground with no points beneath it is likely to be spurious (e.g., caused by the laser hitting a flying insect), while a low-intensity point at long range (far from the vehicle) and close to the ground might not be spurious (e.g., caused by a dark object on the road). These heuristics may therefore be "hand tuned" by making observations about the waveforms of spurious objects.

The storage system 450 as well as data 134 of vehicle 100 may store one or more models 470 as well as model parameter values 472 for each such model. For instance, the storage system may store one or more models for determining states of lanes of interest. A model 470 may include a classifier such as a neural network, a deep neural network, decision tree, boosting tree, etc. In addition, the storage system 450 may include a training subsystem 476 that can be used to train a model as discussed further below.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, as an alternative to a heuristic-based approach, a model may be trained to detect spurious objects. In order to be able to use a model of the one or more models 470 to identify traffic lights, the model may first be trained "offline" that is, ahead of time and/or at a remote computing device and thereafter sent to the vehicle 100 via network 460 and wireless network connections 156. For instance, one or more of server computing devices 410 may generate the model parameter values 472 by first retrieving the training data 474 from the storage system 450.

In order to generate the training data 474, LIDAR sensor data may be analyzed and labeled. These labels may identify spurious LIDAR data points of the LIDAR data. The labels may be initially applied, for instance, by human operators, and in some cases, in part by a vehicle's perception system and/or by applying a machine learned model to the LIDAR data. For instance, the vehicle's perception system may provide a bounding box for an object or the plurality of LIDAR data points corresponding to that object, and thereafter the human operator may adjust the bounding box, if needed, and add a label identifying the object a spurious object. In addition or alternatively, bounding boxes may be created and applied to the LIDAR data by a human operator.

In some instances, human labelers may label only individual points as spurious, such that no bounding box is required. For instance, a human operator may be shown a series of timestamped LIDAR sensor frames, for instance 3 or more or less, and may apply the aforementioned labels to the spurious objects in those frames corresponding to spurious objects. Each frame may correspond to data generated from 1 or more 360 degree rotations of a LIDAR sensor and may be time sequenced such that the frames progress through time. In that regard, a first frame may correspond to a time immediately before a second frame that may correspond to a time immediately before a third frame. As another similar approach, rather than labeling spurious points, the human labeler may label all non-spurious object and anything remaining may be automatically labeled as spurious.

Although the LIDAR data points of the frames may include only location and intensity information, the training data may also include additional details such as the waveform data for the LIDAR data points. In addition to the waveform itself, other information about the waveform may also be used as training data. For instance, other waveform data such as the peak elongation, peak width, and number of pulses may also be included in the training data.

The model may then be trained using the training data 474. For instance, the aforementioned frames as well as waveform data including the waveforms, peak elongation, peak width, and number of peaks for each LIDAR data point of the frames may be used as training input. The labels and any LIDAR data points associated with those labels may be used as training output. The training may provide the parameter values 472, and the more training data used to train the model, the more precise the parameter values will be come. As such, the more training data used to train the model, the more accurate the model will be at identifying spurious objects. Accuracy may refer to having a more precise model with less of a tradeoff with recall, receiver operating characteristic (ROC) curve and corresponding characteristics (i.e. area under the curve), etc. In other words, the model may be trained to identify which LIDAR data points of an input frame correspond to a spurious object. In this regard, each LIDAR data point of each frame as well as its corresponding waveform, pulse elongation for the waveform, peak width for the waveform, and the number of peaks in the waveform may be analyzed individually by the model. The output may therefore be a list of all LIDAR data points and a corresponding likelihood of being a spurious object or alternatively, a list of only those LIDAR data points having a high enough likelihood to be treated as spurious. This may be determined, for instance, using a hand-tuned threshold value selected, of course, given the tradeoff between precision and recall desired.

In some instances, if the labels include additional details about a spurious object, this may be used to make even more refined determinations about spurious objects using the model. For example, if the labels indicate a type of spurious object, such as rain or fog, the model may also be trained to identify a type of the spurious object for any given LIDAR data point. This may be useful, for instance, to determining how the vehicle should respond. For example, if rain is detected, wipers may be turned on to clear sensors, etc. whereas if dust or fog are detected, the vehicle may be slowed down and may predict that other road users are also likely to slow down as well.

In some instances, additional information may also be used to train the model. For instance, map information within some area around the vehicle when the LIDAR data frames were captured may also be used as training input. In addition, sensor data from other sensors of the vehicle, such as camera images and audio from microphones, may also be used to train the model. For instance, camera images may capture spurious objects such as dust, rain or snow, and microphones may capture the sound of rain. This additional data may therefore be useful in distinguishing spurious objects from non-spurious objects.

Figure 8:
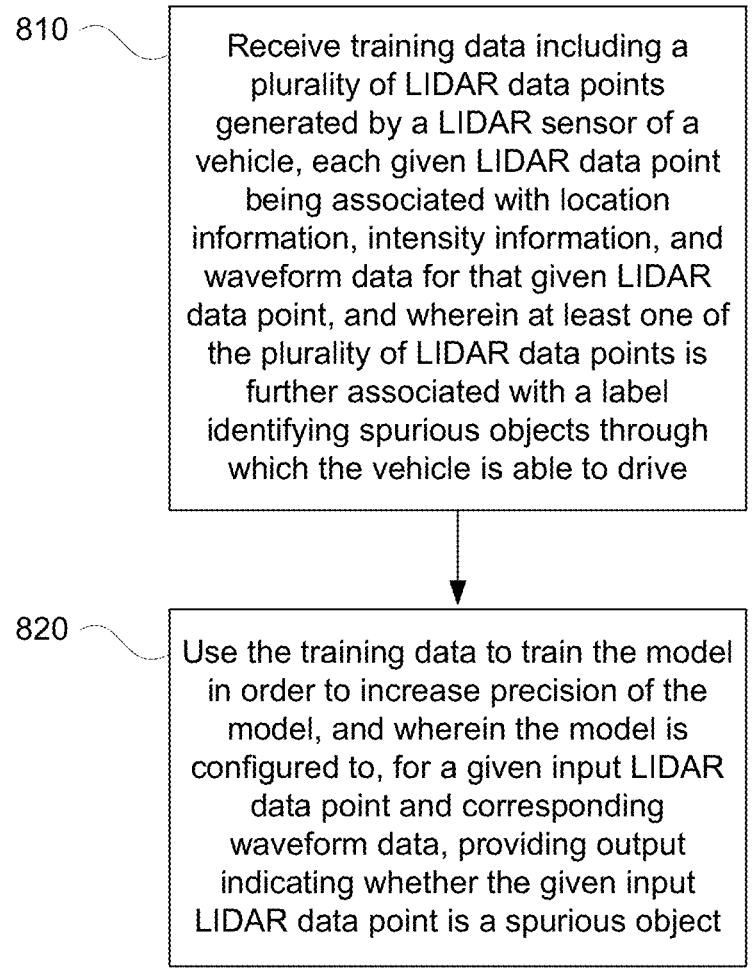
FIG. 8 is an example flow diagram in accordance with aspects of the disclosure.

FIG. 8 is an example flow diagram 800 in accordance with aspects of the disclosure which may be performed by one or more processors of one or more computing devices, such as the processors of server computing devices 410, in order to train a model for detecting spurious objects. For instance, at block 810, training data including a plurality of LIDAR data points generated by a LIDAR sensor of a vehicle is received. Each given LIDAR data point includes location information and intensity information, and is associated with waveform data other than the intensity information for that given LIDAR data point. At least one of the plurality of LIDAR data points is further associated with a label identifying a spurious object that can be distinguished from a solid object based on waveform data for the at least one of the plurality of the LIDAR data points and through which the vehicle is able to drive. At block 820, the training data is used to train the model in order to increase accuracy of the model. The model is configured to, for a given input LIDAR data point and corresponding waveform data, providing output indicating whether the given input LIDAR data point is a spurious object.

The plurality of heuristics and/or the trained model may then be provided to one or more vehicles in order to allow the computing devices of those vehicles to make better informed driving decisions. For instance, the plurality of heuristics 478 and/or the model 470 and model parameter values 472 may be sent to the computing devices 110 of vehicle 100, for instance via network 460, or by otherwise loading this information into the computing devices 110. This information may then be stored in the memory 130 of the computing devices 110 in order to allow the computing devices to use the model to make driving decisions for the vehicle 100.

Figure 9:
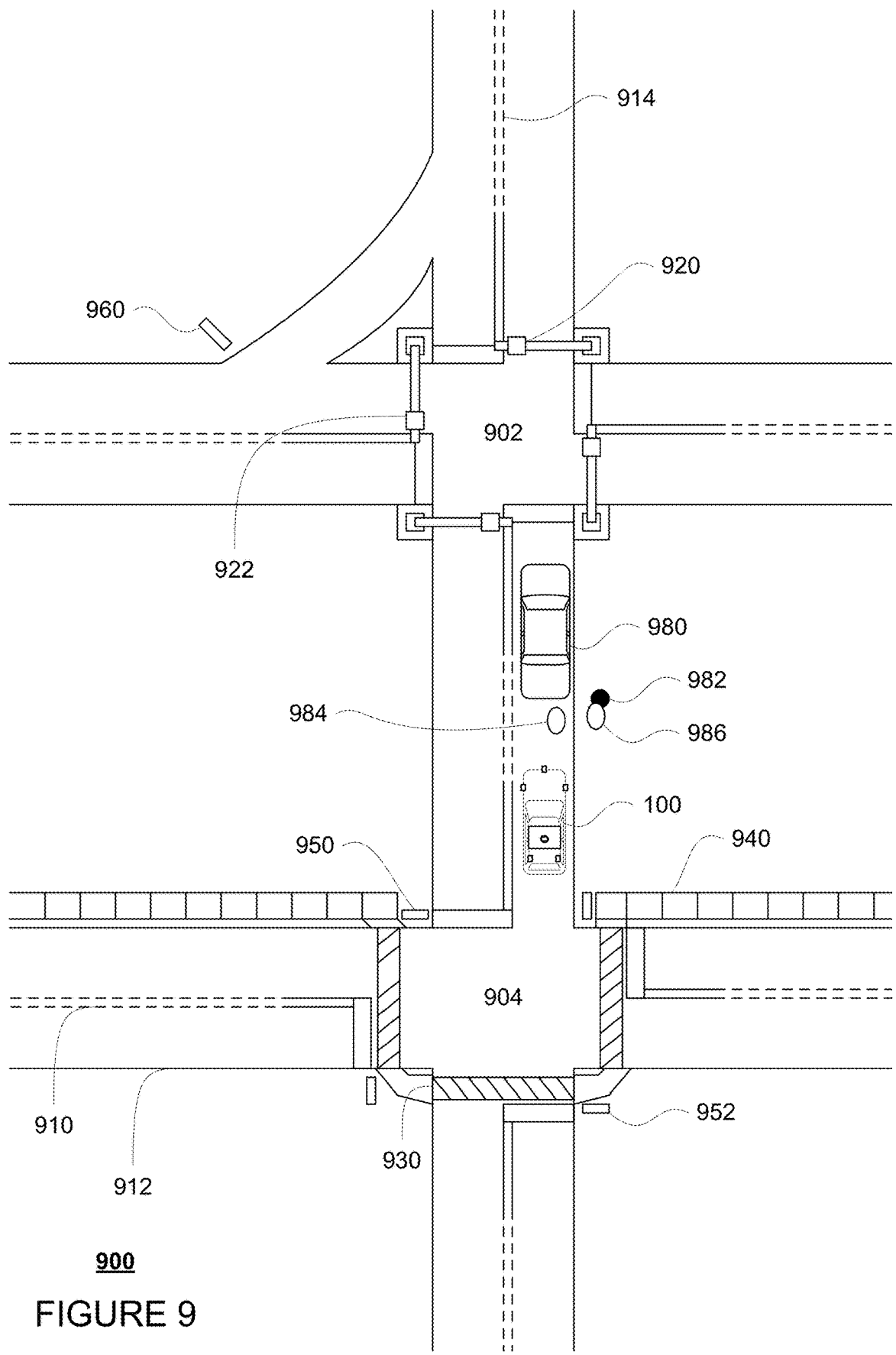
FIG. 9 is an example top-down view of a vehicle and its environment in accordance with aspects of the disclosure.

For demonstration purposes, FIG. 9 depicts vehicle 100 being maneuvered on a section of roadway 900 including intersections 902 and 904. In example 900 of FIG. 9, vehicle 100 and vehicle 980 are each approaching an intersection 902. Adjacent to vehicle 980 is a pedestrian 982. In the area around vehicle 980 and pedestrian 982, there is also clouds of vehicle exhaust 984, 986 (these may not necessarily be visible to the human eye, but are depicted here for the purposes of the example). In this example, intersections 902 and 904 correspond to the locations of intersections 202 and 204 of the map information 200, respectively. Similarly, lane lines 910, 912, and 914 correspond to the shape, location, and other characteristics of lane lines 210, 212, and 214, respectively. Similarly, crosswalk 930 corresponds to the shape, location, and other characteristics of crosswalk 230, respectively; sidewalks 940 correspond to sidewalks 240; traffic lights 920, 922 correspond to traffic lights 220, 222, respectively; stop signs 950, 952 correspond to stop signs 250, 252, respectively; and yield sign 960 corresponds to yield sign 260.

Figure 10:
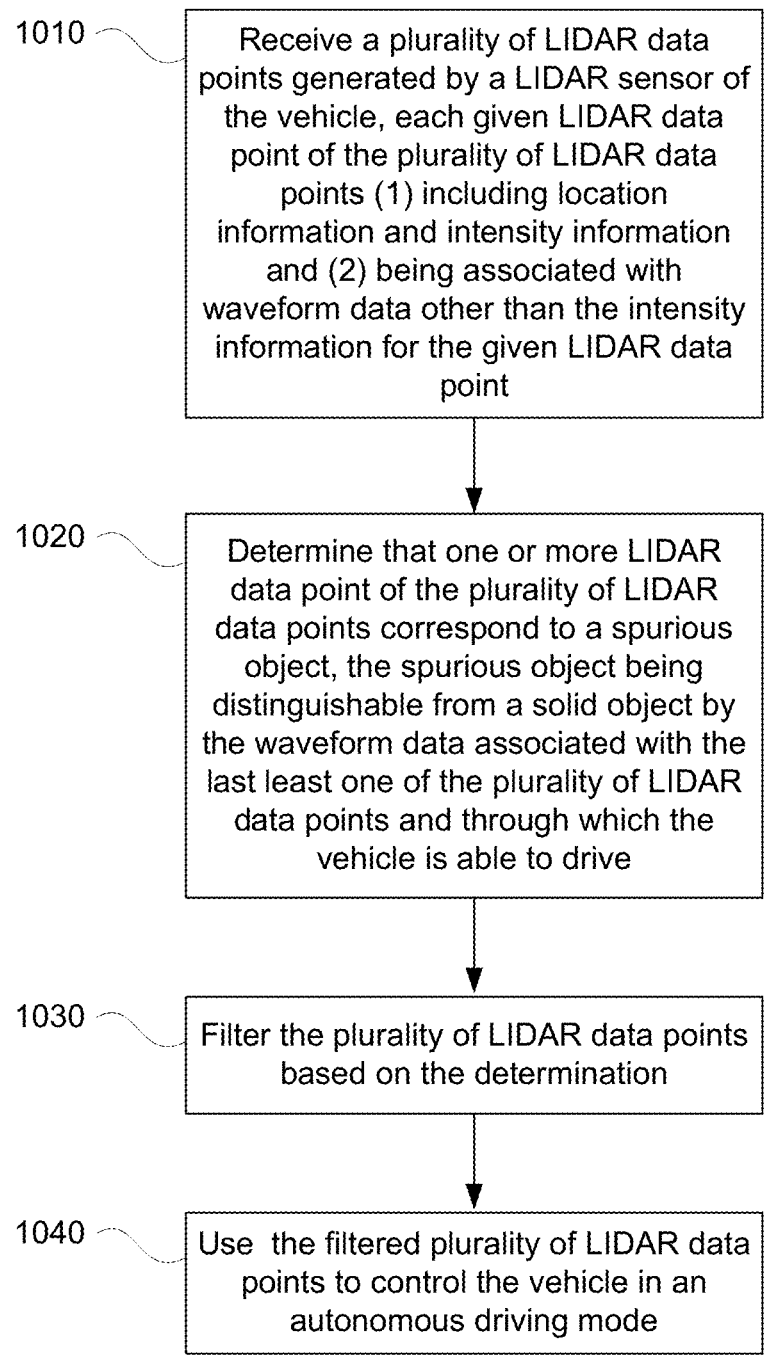
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to control a vehicle in an autonomous driving mode. Turning to block 1010, a plurality of LIDAR data points generated by a LIDAR sensor of the vehicle are received. For instance, as vehicle 100 drives around, perception system 172 captures sensor data of the vehicle's environment. For example, LIDAR sensor frames including LIDAR sensor data may be collected by a LIDAR sensor of the vehicle, such as the LIDAR sensor of dome housing 312, and provided to the computing devices 110. For example, returning to FIG. 9, the perception system 172 may capture sensor data for the various objects in vehicle 100's environment, including vehicle 980, pedestrian 982, and vehicle exhaust 984, 986.

Each given LIDAR data point of the plurality of LIDAR data points may include location information and intensity information, and may also be associated with waveform data other than the intensity information for the given LIDAR data point. For instance, for each LIDAR sensor data point of the LIDAR sensor data from the LIDAR sensor may include location information, intensity information, as well as the sampled points and/or the waveform. The sampled points and/or the waveform may be processed, for instance by the computing devices 110 and/or the LIDAR sensor itself, in order to identify characteristics of the waveform (other than simply the peak intensity) or the waveform data including the peak width, the number of peaks, the shape of the peak(s), and peak elongation.

Turning to block 1020, that one or more LIDAR data point of the plurality of LIDAR data points correspond to a spurious object is determined using at least the waveform data for the plurality of LIDAR data points. In this instance, a spurious object may include an object which appears to be a solid object from the LIDAR data point, but can be distinguished from a solid object based on waveform data for the LIDAR data point and through which the vehicle is able to drive such as exhaust, dust, precipitation (e.g. rain, snow, etc.), fog, etc. For example, this determining may involve the computing devices 110 analyzing the waveform data for the plurality of LIDAR data points using the heuristics to identify the one or more LIDAR data points. In addition or alternatively, for instance to verify (or vice versa) this identification, the waveform data and LIDAR sensor frame may be input into the model to identify the one or more LIDAR data points. In addition, the map information within some area around the vehicle when the LIDAR data frame was captured may also be input into the model if such information was used to train the model.

In some instances, the likelihood of a LIDAR data point may be determined using both the heuristics and the model. The higher of the two likelihoods (i.e. whichever likelihood indicates that the LIDAR data point is more likely to be a spurious object) may then be compared to a hand-tuned heuristic to identify whether the LIDAR data point is a spurious object.

Any LIDAR data points identified as spurious objects may then be grouped together. These groupings may be done based on the density of LIDAR data points identified as spurious objects. For instance, a threshold minimum relative density of points corresponding to spurious objects may be required before grouping those points together. For example, for a group of 5000 LIDAR data points in a given volume of space in a frame, if at least 4500 (or 90%) have been identified as spurious objects, those LIDAR data points identified as spurious objects may be grouped together. In some instances, the groups of LIDAR data points may be collected into a bounding box.

Of course, the absolute density points may depend on how far away those LIDAR data points are from the LIDAR sensor as further away there are just fewer laser points. In other words, greater densities of LIDAR data points may be expected closer to the LIDAR sensor than farther away. To address this, the density may be considered for smaller, local regions. For example, for a rectangular column of space 20 cm on a side extending from the ground to 2 meters in height, if there are only a very small number of LIDAR data points, for example 10 or more or less, in such a volume, it may be more likely that the whole volume is spurious as typically for a solid object at within a 20 meter range, there may be dozens or hundreds of LIDAR data points in that same volume. The densities of similarly sized columns of space proximate to one another may be analyzed, and if many of them are determined to be spurious, entire groups of LIDAR data points within such columns may be identified as spurious objects. In some instances, this information may be used to subdivide a given group into spurious and non-spurious subgroups. In other words, if there is a large increase in the density within a given column of space relative to other nearby columns of space, this may indicate a non-spurious object or group of LIDAR data points.

Returning to FIG. 10, at block 1030, the plurality of LIDAR data points are then filtered based on the determination. In other words, the one or more LIDAR data points corresponding to spurious objects may be filtered from the plurality of LIDAR data points. To simplify this filtering, the aforementioned groups of points and/or bounding boxes may then be filtered from the LIDAR sensor frame and/or the plurality of LIDAR data points.

Then, at block 1040, the filtered plurality of LIDAR data points may be used to control the vehicle in an autonomous driving mode. For instance, the resulting filtered frames may then be used to make driving decisions for the vehicle. In other words, the vehicle's various systems, such as the vehicle's navigation system 168 and planning system which generates trajectories for the vehicles to follow (which may be incorporated into computing devices 110), can simply ignore these points as they correspond to spurious objects. This allows the vehicle's computing devices to ignore data for vehicle exhaust, dust, fog, precipitation, etc. which can save significant processing resources, especially in situations when it is raining and large numbers of LIDAR data points may be filtered. In this regard, the computing devices 110 are able to recognize spurious objects and prevent the vehicle from reacting to them, for instance by braking harshly, which in some instances can be disconcerting to the vehicle's occupants. In some instances, the groups of LIDAR data points and/or individual LIDAR data points may also be combined with other information in order to confirm the detection. This other information may include additional hand-tuned heuristics. As one instance, the locations of a group of LIDAR data points and/or corresponding bounding boxes may be compared to sensor data from other sensors of the vehicle to confirm whether the points correspond to a spurious object. For instance, a shiny metal object such as a shopping cart or bike wheel can have a similar waveform to rain, but if there is a strong signal from a radar unit of the vehicle for that object, the LIDAR data points of a group at the same location as that object cannot be rain. As such, that group of LIDAR data points would not be filtered.

The LIDAR data points that are filtered may be combined with other information to allow the computing devices 110 to determine additional information about the vehicle's environment which may be used to make driving decisions. For instance, given the amount of and locations of spurious objects detected, the computing devices 110 may determine that it is raining or that there is precipitation in the air. This can be used by the computing devices 110 to infer that the road surface is wet which can be used to influence the vehicle's behavior. For instance, the computing devices 110 may slow the vehicle down or change how the vehicle performs certain maneuvers. Similarly, the computing devices 110 may infer that other vehicles are likely to drive more slowly and more cautiously and respond to those vehicles accordingly. For another instance, the areas from which LIDAR data points are filtered may correspond to areas where the vehicle's sensors are less effective than usual. This information may be fed into the perception and/or planner systems to better respond to the vehicle's environment.

In addition or alternatively, it may be possible for all or part of another road user, such as a pedestrian, bicyclist, or vehicle to be identified as a spurious object. For instance, a pedestrian holding a leaf blower may create a cloud of dust or a pedestrian may be standing in the rain, snow, or proximate to vehicle exhaust (as in the example of FIG. 9). As such, at least some points identified as spurious objects may overlap with a bounding box for a pedestrian detected by a pedestrian classifier. As another instance, if a vehicle drives through a puddle, it may throw up water droplets. Again, at least some points identified as spurious objects may overlap with a bounding box for a vehicle detected by a vehicle classifier. In these situations, the points identified as spurious objects within the bounding box for the pedestrian or vehicle may or may not be filtered. In this regard, the pedestrian and vehicle data will still be fed to the other systems of the vehicle and the pedestrian and vehicle classifiers are effectively used as a check on the identification of spurious objects.

Figure 11:
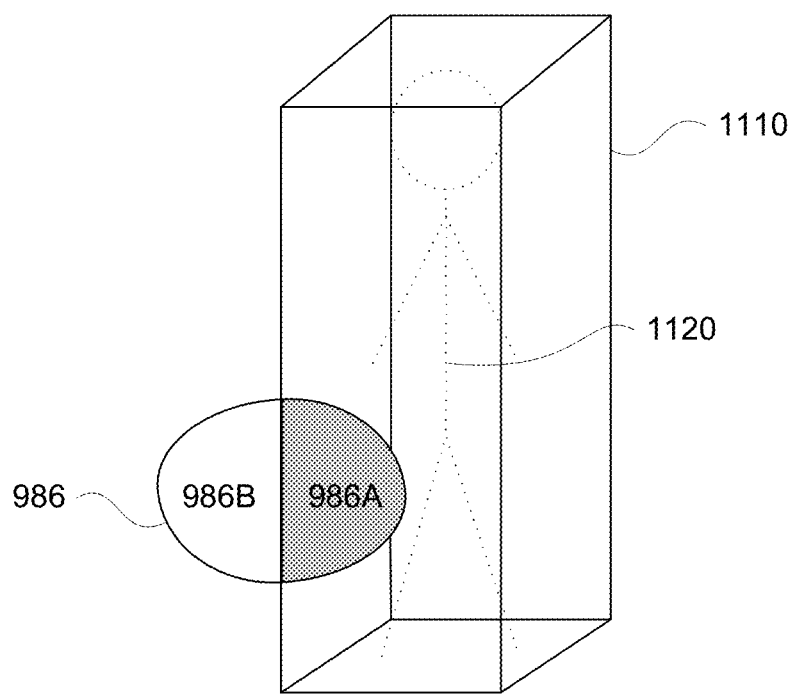
FIG. 11 is an example of a bounding box and data in accordance with aspects of the disclosure.

As one instance, turning to the example of FIG. 11, a bounding box 1110 represents an area of LIDAR data points 1120 determined by the computing devices 110 to correspond to pedestrian 982. In this example, a portion 986A (shown as shaded) of the vehicle exhaust 986 overlaps with the volume of space within the bounding box 1110, and a portion 986B of the vehicle exhaust 986 is outside of the bounding box 1110. As such, portion 986B may be filtered as described above, but portion 986A may not be filtered. Again, by not filtering the portion 986A, the LIDAR data points of this portion which overlap with the bounding box 1110 for the pedestrian 982 are still be fed to the other systems of the vehicle and the pedestrian classifier is effectively used as a check on the identification of spurious objects. This, in turn, prevents the "over-filtering" of objects which may not actually be spurious objects and significantly increases safety by preventing the vehicle from being able to drive through objects which are not actually spurious.

Figure 12:
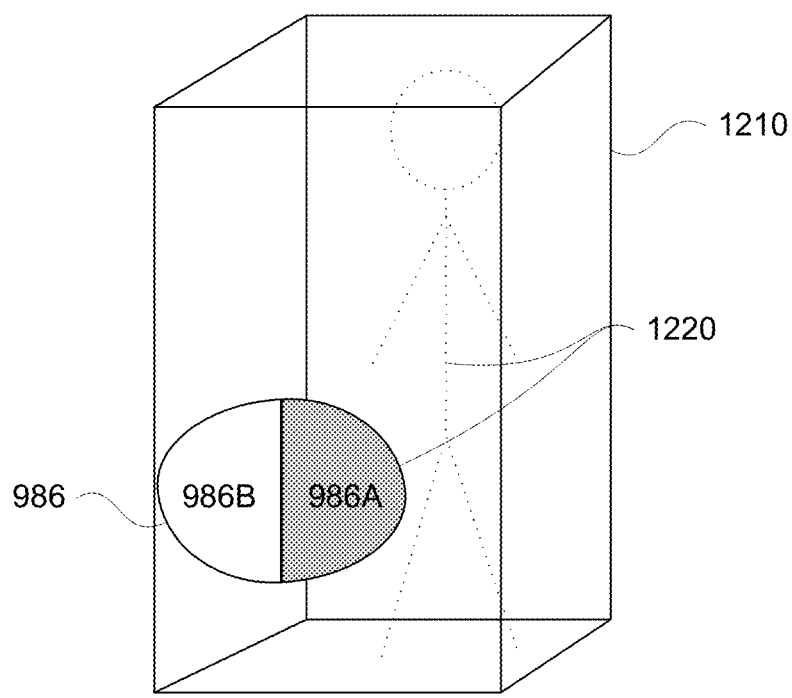
FIG. 12 is another example of a bounding box and data in accordance with aspects of the disclosure.

As another instance, turning to the example of FIG. 12, a bounding box 1210 represents an area of LIDAR data points determined by the computing devices 110 to correspond to pedestrian 982. In this example, the vehicle exhaust 986 has been incorrectly clustered with the LIDAR data points 1220 and identified as a pedestrian. As such, the bounding box 1210 for the pedestrian 982 is larger than it normally would be (i.e. as compared to the size of bounding box 1110). Using the examples above, the computing devices 110 may determine that some portion of the LIDAR data points 1220, here corresponding to vehicle exhaust 986, correspond to a spurious object, here the vehicle exhaust, and that the remaining portion of the LIDAR data points 1220 correspond to a pedestrian, for instance, by process of elimination and because of the bounding box label. As such, the outer edges of the cluster of LIDAR data points corresponding to the vehicle exhaust, here 986B may be filtered, for instance, by reducing the dimensions of the bounding box until any further reductions would result in the LIDAR data points corresponding to the pedestrian being outside of the bounding box 1210. In this example, the computing devices 110 may effectively be able to reduce the size of the bounding box 1210 to that of bounding box 1110. Again, by not filtering the portion 986A, the LIDAR data points of this portion which overlap with the reduced bounding box for the pedestrian 982 are still be fed to the other systems of the vehicle and the pedestrian classifier is effectively used as a check on the identification of spurious objects. This, in turn, prevents the "over-filtering" of objects which may not actually be spurious objects and significantly increases safety by preventing the vehicle from being able to drive through objects which are not actually spurious.

The features described herein allow for detection of spurious objects using heuristics and/or a model which provide useful and effective ways for the detection of spurious objects. While typical approaches may rely on intensity and contextual information, by using the waveform data, the heuristics and/or model can be significantly more effective at detecting spurious objects. Moreover, the model can be combined with other information and heuristics to not only detect spurious objects, but also determine which of those spurious objects should and should not be filtered or ignored when deciding how to control the vehicle. In addition, the model may even be used to determine a type of the spurious object which can be important to determining how to control the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle, the method comprising:
   receiving, by one or more computing devices, a plurality of LIDAR data points generated by a LIDAR sensor of the vehicle, each given LIDAR data point of the plurality of LIDAR data points (1) including location information and intensity information and (2) being associated with waveform data other than the intensity information of the given LIDAR data point;
   determining, by the one or more computing devices, that one or more LIDAR data point of the plurality of LIDAR data points correspond to a spurious object using the waveform data associated with the plurality of LIDAR data points, the spurious object being distinguishable from a solid object by the waveform data associated with at least one of the plurality of LIDAR data points and through which the vehicle is able to drive;
   filtering, by the one or more computing devices, the plurality of LIDAR data points based on the determination; and
   using, by the one or more computing devices, the filtered plurality of LIDAR data points to control the vehicle in an autonomous driving mode,
   wherein the one or more LIDAR data points corresponding to the spurious object includes a plurality of peaks, and each peak width of each of the plurality of peaks is used individually to determine the one or more LIDAR data points corresponding to the spurious object.

2. The method of claim 1, wherein spurious objects include objects corresponding to at least one of vehicle exhaust, dust, rain, snow, or fog.

3. The method of claim 1, wherein the determining is further based on one or more heuristics.

4. The method of claim 3, wherein the one or more heuristics is based on a peak elongation of waveform data for a particular LIDAR data point.

5. The method of claim 3, wherein the one or more heuristics is based on a number of peaks in waveform data for a particular LIDAR data point.

6. The method of claim 3, wherein the one or more heuristics is based on a peak width in waveform data for a particular LIDAR data point.

7. The method of claim 3, wherein a particular LIDAR data point of the plurality of LIDAR data points is further associated with a peak elongation relative to an expected peak width, and wherein the peak elongation is used to determine whether the LIDAR data point corresponds to a spurious object through which the vehicle is able to drive.

8. The method of claim 1, wherein the waveform data associated with a particular LIDAR data point of the plurality of LIDAR data points includes a plurality of samples of light received at the LIDAR sensor for the particular LIDAR data point.

9. The method of claim 1, further comprising using the waveform data associated with the one or more LIDAR data points to determine a type of the spurious object.

10. The method of claim 1, wherein the plurality of LIDAR data points corresponds to a single frame captured by the LIDAR sensor.

11. The method of claim 1, wherein the frame corresponds to one 360 degree rotation of the LIDAR sensor.

12. The method of claim 1, further comprising, prior to the filtering, grouping the one or more LIDAR data points determined to correspond to a spurious object such that only grouped LIDAR data points are filtered from the plurality of LIDAR data points.

13. The method of claim 12, wherein the grouping is based on a threshold minimum density of points determined to correspond to a spurious object within a given volume of space.

14. The method of claim 13, wherein the filtering allows the one or more LIDAR data points to be ignored by one or more systems of the vehicle when controlling the vehicle in the autonomous driving mode.

15. The method of claim 1, further comprising prior to the filtering,
   confirming the determination based on whether the locations of the one or more LIDAR data points correspond to a location having a particular signal from a second sensor of the vehicle, and wherein the filtering is further based on the confirmation.

16. The method of claim 15, wherein the second sensor is a radar unit.

17. The method of claim 1, further comprising:
   receiving information identifying at least some of the plurality of LIDAR data points correspond to an object being road user of a particular type; and
   prior to the filtering, confirming the determination based on whether the one or more LIDAR data points correspond to the road user of a particular type based on the received information, and wherein the filtering if further based on the confirmation.

18. The method of claim 17, wherein the particular type is one of a pedestrian, a bicyclist, or a vehicle.

19. The method of claim 17, wherein the information includes a bounding box for the object, and confirming the determination is further based on whether the one or more LIDAR data points are associated with locations within the bounding box.

20. The method of claim 1, wherein the spurious object is precipitation.

21. The method of claim 1, wherein the spurious object is dust.

22. The method of claim 1, wherein the spurious object is fog.

* * * * *

UNITED STATES PATENT AND TRADEMARK OFFICE
CERTIFICATE OF CORRECTION

Page 1 of 1

PATENT NO. : 11,221,399 B2
APPLICATION NO. : 16/217899
DATED : January 11, 2022
INVENTOR(S) : Clayton Kunz, Christian Lauterbach and Roshni Cooper It is certified that error appears in the above-identified patent and that said Letters Patent is hereby corrected as shown below:

In the Claims

Column 20, Line 13:
Claim 11: "The method of claim 1," should read -- The method of claim 10, --

Signed and Sealed this
Tenth Day of May, 2022

Katherine Kelly Vidal
*Director of the United States Patent and Trademark Office*